Figure 1:
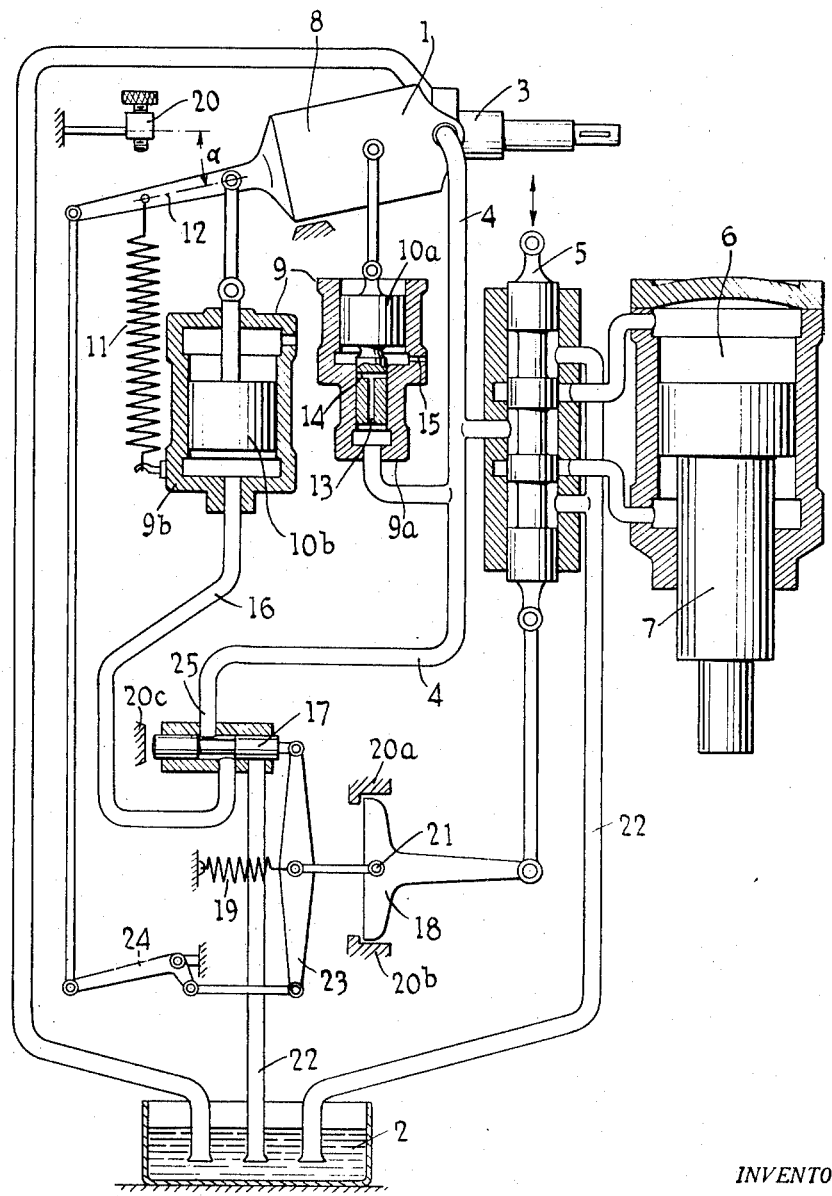

INVENTOR.
HANS THOMA
BY
Hammond & Littell
ATTORNEYS

INVENTOR.
HANS THOMA
BY
Hammond & Littell
ATTORNEYS

Patented May 15, 1951

2,552,604

UNITED STATES PATENT OFFICE 2,552,604

FLUID PRESSURE CONTROL FOR VARIABLE DELIVERY PUMP HYDRAULIC DRIVE SYSTEM CONTROL

Hans Thoma, Muttenz, near Basel, Switzerland, assignor to Ludwig Von Roll 'Schen Iron Works, A. G., Klus, Switzerland, a corporation of the Swiss Confederation Application December 31, 1947, Serial No. 795,092 In Switzerland June 6, 1945

13 Claims. (Cl. 60—52)

This invention relates to the control for a fluid operated system and particularly to a control of the fluid supply therefor.

In hydraulic drives and particularly in hydraulic presses the change in direction of the rotation or pressure movement is frequently accomplished by a slide valve which shifts the source of oil according to the desired direction of movement, to one of the sides of the rotating secondary member (oil motor). In the case of presses and in some other drives the rotating member is replaced by a piston reciprocating in a cylinder. The source of oil pressure may be a regulable oil pump. In order to limit the expenditure of power which would be caused by a pump limited in its greatest development of pressure during cessation or slow movement of the secondary member by a safety valve, use is made of a pump regulable by a change of the effective pressure of the piston, said pump being built similar to the regulable pump or oil motor members used in the construction of hydraulic drives, said pump being supplemented by a suitable pressure regulator, which with a corresponding rise of the pressure, reduces the pressure developed by the piston of the regulable oil pump to a small quantity such as is just necessary for the maintenance of the operating pressure. The invention also may be used with a regulable pump in order to limit the expenditure of power with slide valves, which in their median position do not, as in the so-called through flow system, allow the stream of oil moved by the pump to flow through at a moderate counter-pressure, but interrupt the flow of fluid through the pump entirely or almost entirely by closing off appropriate openings.

With known arrangements, considerable power is saved by regulating the quantity of fluid transmitted by the pump, as compared with an arrangement operating with a non-regulable pump and a safety valve. With a hydraulic press, the disadvantage remains that on cessation and slow movement of the secondary member or of the compression cylinder, the pump almost always develops the full maximum pressure, such as is often used only occasionally or for short periods during greater resistances to movement of the secondary member. With presses, the maximum pressure is used often only at the lower end of the movement. This results in an undesirably high stress on the pump, which can be considered to be a continuous load. This gives a comparatively small choice in the utilization of the regulable pump because most of such pumps can withstand for a short time or during occasional overloads, a multiple of the allowable pressure. The expenditure of power which such pumps require, according to their type of construction, even with a small quantity passing through, may be considerable.

The known systems operating with slide valves and regulable pumps with pressure regulation of their operation wherein frequently a strong operating pressure can therefore not attain the power of economy and not attain the great load capacity of the known hydraulic drive system operating without a slide valve in the main cycle, in which the primary pump arranged for reversing (that is, not merely regulable) movement, is connected directly via two pipes or channels with the secondary member (or also with the compression cylinder), the shift correspondingly proceeding with utilization of the reversal of the direction of the movement by the pump.

This known system which gives a good power economy and a high utilization of the hydraulic drives and which is usually called "a closed cycle" normally possesses the disadvantage that for actuating the change of movement of the primary pump necessary for the shift, a separate auxiliary motor is usually necessary, because the adjustment of the movement usually requires greater forces. Stopping or reversal also must usually proceed very rapidly. Further, particularly with presses which use piston surfaces of different sizes for the different movement phases of the compression cylinder, the difficulty results that valves which require their own control are necessary to impart to the changing oil volume of this driving system the equalization by use of a correspondng oil container.

The present invention shows a way wherein the slide valve, which in many cases is to be preferred merely because of its simple handling, and a pump, regulable only and not to be operated for changing direction of the movement, can be used. Briefly, with retention of the open cycle operation with the slide valve, even a greater economy can be obtained and also the same use of the hydraulic parts as in the above-mentioned "closed cycle."

In one aspect of the invention, a variable delivery pump means is connected to a working piston through a main control valve, the main control valve operating to admit or exhaust pressure relative to the working piston or motor. A pressure reducing control arrangement is connected to the variable delivery pump means and with the main control valve so that it will reduce the pressure delivered when the main control valve is moved to its median or neutral position. This can be accomplished by a direct link connection with the main control valve, with a fluid connection to the main valve and control elements on the main valve, or by other similar means.

In accordance with the invention this is achieved in that there is connected with the slide valve an arrangement by means of which, when the slide valve has approached its median position, in place of the regulation of the pressure pump, the adjustment is made of the lift or pressure of the pump dependent upon the adjustment of the slide valve. In the neighborhood of the median position of the slide valve in which the latter more or less throttles or even completely closes the channels for the liquid, only small proportions of the pump pressure or smaller proportions of the pressure generated by the pump may occur. The generation of the maximum pressure when the slide-valve is in the median position is entirely unnecessary for practically all drives and such greatly limits the efficient utilization of the pump.

As compared with a known arrangement in which the mechanism actuating the slide-valve, such as a manual lever at its lift end, which acts mechanically upon a pressure regulator attached to a regulable pump, thereby causing the same to generate higher pressures, the advantage is obtained that instead of this mechanical action, the pressure regulator itself is used to change the adjustment of the pump, so that as easy operation is obtained as with an ordinary slide valve which operates at a constant high pressure. Furthermore, the adjustment of the pressure regulator as taught by this invention can, in view of the comparative small forces necessary therefor, easily be so arranged that it manifests itself near the median position of the slide valve, while the direct mechanical loading of a pressure regulator by the adjustment means itself requires greater expenditures of power and therefore can be realized practically only at one or at both ends of the lift by a stop acting upon the pressure regulator.

Fig. 1 shows one form of the invention, wherein 1 is the regulable pump which transmits a suitable liquid, such as oil, from the oil tank 2 and sends it into the pressure line 4. The slide valve 5 in the customary manner controls the secondary member (oil motor) of a hydraulic drive, or, as is shown in Fig. 1, controls the compression piston 7 operating in compression cylinder 6 of a hydraulic press. In agreement with the utilization of an open cycle, the latter may be provided with a slide valve for the movement of piston surfaces of various sizes, without the necessity for having any special provisions therefor. A regulable pump of any known type of construction, such as is customary in the construction of drives, may be used as pump 1. A known regulable pump is shown by way of example in Fig. 1, in which the driving shaft 3, driven in a suitable manner, rotates around an axis fixed in the space, and a swingably rotating cylinder block which is balanced in the swinging frame 8 and with its angle of swing position determining the quantity of liquid supplied to the pressure pipe 4. One type of such a pump may be that known as the axial piston type wherein a tumbler ring transmits power to axially movable pistons. As is customary, the movement by this pump is determined by a pressure regulator 9. Deviating from the known type of construction however, the pressure regulator in accordance with the invention is affected by the position of the slide valve 5, that is, in such manner that the production of unnecessarily high operating pressures at pump 1 or in the pressure line 4 are avoided in continuous operation and particularly in the neighborhood of the median position of the slide valve 5, as shown in the drawing. For this purpose the pressure regulator is present in duplicate, $9a$ and $9b$. Pressure pistons $10a$ and $10b$ of the two pressure regulators, for example, act against a common spring 11 and engage the adjustment means of regulable pump 1, in this case the swinging frame 8 or a prolongation 12 connected therewith, which also serves to hold the spring 11.

The first pressure regulator $9a$ is connected directly to pressure pipe 4 and is of a size appropriate for the maximum pressure of the pump allowable for a short time. In accordance with this invention, it may be so arranged that on reaching the maximum pressure and cessation or with only slow movement of compression piston 7 it changes over at an operating condition at low pressure as explained hereafter. For this purpose, for example, the lower part of pressure piston $10a$ is provided with transverse bores 13 and 14, which, after adjustment of the pump for small lifts, allow the maximum pressure to be produced under the enlarged head of pressure piston $10a$ and hence correspondingly decrease the operating pressure. A throttle orifice 15 provides that, after shifting the press or with a rotary drive, after complete or approximate cessation and of the reversal of the movement, the original capacity for an excess load can again be reached in accordance with the smaller, lower piston surface of pressure piston $10a$.

The pressure regulator $9a$ executed in the manner given as a two-stage pressure regulator operates in accordance with the basic idea of the invention, wherein the movement by the pump is to be diminished in accordance with the position of slide valve 5 as soon as slide valve 5 approaches its median position, as shown in Fig. 1. Particularly when in this median position, slide 5 closes the oil channels completely or when it approaches its median position, a pressure peak is produced each time, which is thereupon reduced by the double-stage execution of the pressure regulator as drawn.

The invention may also be accomplished in a manner such that no short pressure peak is produced when the slide valve 5 approaches its median position. This can be done without its being necessary to construct such a slide with larger, open flow ports in the median position which, as a result of its large requirement of liquid, would bring about larger losses, even at moderate operating pressures, and also would be difficult to bring into agreement with the pressure stage dependent upon the quantity moved, as is shown by pressure regulator $9a$ in Fig. 1.

In Fig. 1 this effect is obtained by the second pressure regulator $9b$, it being equipped with a correspondingly large piston $10b$ and at a suitably selected low pressure in the pressure control pipe line reduces the quantity moved by the pump and so that the same may act only near the median position of the slide valve 5, it is connected by means of auxiliary slide 17 to the high pressure line. The auxiliary slide is connected by the linkage shown through the triangular lever 18, to the slide valve 5 in such manner that the connection between the pressure control line 16 of pressure regulator $9b$ and the main pressure line 4 is established only when this slide valve 5 is in the median position. In the form shown by way of example in Fig. 1, this is attained when triangular lever 18 is pulled by spring 19 toward stops 20a and 20b. The lever can be in contact with both stops only when the slide valve 5 is in the median position indicated. If the latter is moved upwardly, then the lower end of the triangular lever 18 moves away from stop 20b, and conversely, upon moving slide valve 5 downwardly, the upper end of the same moves away from stop 20a. In both cases, pivotal point 21 moves to the right and also pushes auxiliary slide 17 to the right, whereby pressure regulator 9b is shut off from pressure line 4 and is shunted over to discharge line 22 and hence to the open oil tank 2. Pressure regulator 9b with its initially low pressure adjustment, is thus made ineffectual and pump 1 can now generate a high pressure in accordance with the above described arrangement of pressure regulator 9a.

In many cases it is advantageous to make the actuation of the auxiliary slide 17, which shunts the low pressure regulator 9b, dependent not only upon the slide valve but also upon other operating factors, for example upon the stroke adjustment or the quantity moved by pump 1. In Fig. 1, the return lever 23, whose lower end is connected, for example, by means of bell crank 24 with the swinging frame 8 of pump 1 or respectively, with prolongation 12 attached to the swinging frame.

With this arrangement, as seen in Fig. 1 for the low pressure regulator 9b, the latter does not act as a pure pressure regulator, but as a pressure regulator dependent upon its location, wherein the suitably chosen strength of the spring 11 contributes to the behavior of this pressure regulator.

It is, however, also possible to let the low pressure regulator 9b operate as a pure location regulator, or stated more accurately, as a pure servomotor which, dependent upon the deviation of the slide valve 5 from its median position, permits only definite values for the greatest stroke adjustment of pump 1 and hence, of the movement by the pump, and otherwise in no way hinders the mode of operation of high pressure regulator 9a.

In order to attain this it would merely be necessary in Fig. 1 to connect the pressure supply orifice (not shown) 25 at the auxiliary slide 17 (instead of with the main pressure line 4), with a foreign source of oil. Such supply should have sufficiently high pressure, e. g. a separate gear pump, such as is frequently used for such controls, to produce the desired results.

Substantially the same result is attained if the piston of the low pressure regulator 9b is made so large that even with the lowest values for the operating pressure, its power is sufficient for adjusting the pump 1 for small quantities to be moved. Such an appliance which limits the magnitude of the stroke adjustment quantity moved by pump 1 in accordance with the deviation of the slide valve 5 from its median position, is satisfactory in its operation particularly when slide valve 5 is constructed suitably as a through flow valve. If grooves are applied at the control edges of a slide valve constructed with sufficient covering, by which, in addition to the elimination of the disturbing lack of sensitivity of a slide valve 5 made with extensive overlap, even in the median position of the slide, allows a measured flow of the liquid moved by the pump, which together with the explained, suitably chosen limitation of the adjustment of the lift of the pump, results in an appropriate limitation of the pressure for the latter.

In some instances, the high pressure is necessary only for one direction of stroke adjustment or movement of the secondary member, for example, in a compression cylinder 6, as shown in Fig. 1, sometimes high pressure is required only for the downward movement. In this case stop 20b may be omitted, or triangular lever 18 may be replaced by a bell crank lever. Then a stop 20c at the auxiliary slide 17 may be advantageous in order to prevent too great a displacement of this slide to the left. Spring-actuated closure elements may be necessary here in order to avoid breaks in the linkage along with other provisions known in the building of controls requiring no special mention.

In order to attain the action taught by the invention, it also is necessary only with drives which require generation of high pressure on one side only, to adjust an appliance operating only on one side, similar to Fig. 1, so that the pressure limiting action of pressure regulator 9b is effective near the median position of the slide valve 5 and is eliminated only by the appropriate displacement of auxiliary slide 17 when the guiding edges of slide valve 5 are opened far enough for the respective direction of movement so that the increased quantity moved by pump 1 can pass through reversing member 5 without too great a power-consuming throttling.

Similarly, if as described above, the pressure regulator 9b in Fig. 1 does not act as a true pressure regulator but operates entirely or partially as a servomotor which limits the stroke adjustment of the pump and the fluid quantity supplied near the median position of the slide and this in cooperation with suitable flow properties or leaks at the slide will eliminate the generation of high pressure by the pump when the slide is in the median position.

The inventive concept also can be achieved in a purely mechanical manner by a suitable mechanical appliance such as a triangular lever as in Fig. 1 or by a cam so connected with the adjusting mechanism of the slide valve that the stroke of the pump in the median position of the slide is limited. As a rule such a mechanical reduction of the pump stroke would become too complicated, so that a servomotor of some known type is necessary, and in many cases the hydraulic servomotor, in its operation often is a pressure regulator and is the most appropriate solution.

The details of the construction as described are of immaterial relationship to the invention. For example, the slide valve 5 in Fig. 1 or the auxiliary slide 17 may be replaced in known manners by valves, or valves which are so operated by a common cam-shaft that they replace the action of a slide. Further, one may equip the low-pressure regulator 9b with an outlet throttle-orifice similar to 15 or 9a. Then slide 17 may be so simplified that it merely opens and closes the connection between pressure line 16 and 4 so that it also may be replaced by a simple valve.

Finally, the two pressure regulators 9a and 9b in Fig. 1 may be combined in many ways. Even when using a single pressure regulator 9a, as described above, effects can be obtained, which with the form of construction, as shown in Fig. 1, can be obtained only by means of both pressure regulators. For example, an auxiliary slide similar to 17 in Fig. 1 could be used for making available with pressure regulator 9a a further, larger outlet orifice parallel to throttle opening 15, so that it would be possible to initiate the generation of high pressure by the pump upon displacing slide valve 5 from its median position. If the pressure control line 16 is also used in order to actuate the larger piston of pressure regulator 9a, then the same result can be obtained with a single pressure regulator, as is possible in Fig. 1 with two pressure regulators.

Figure 2:
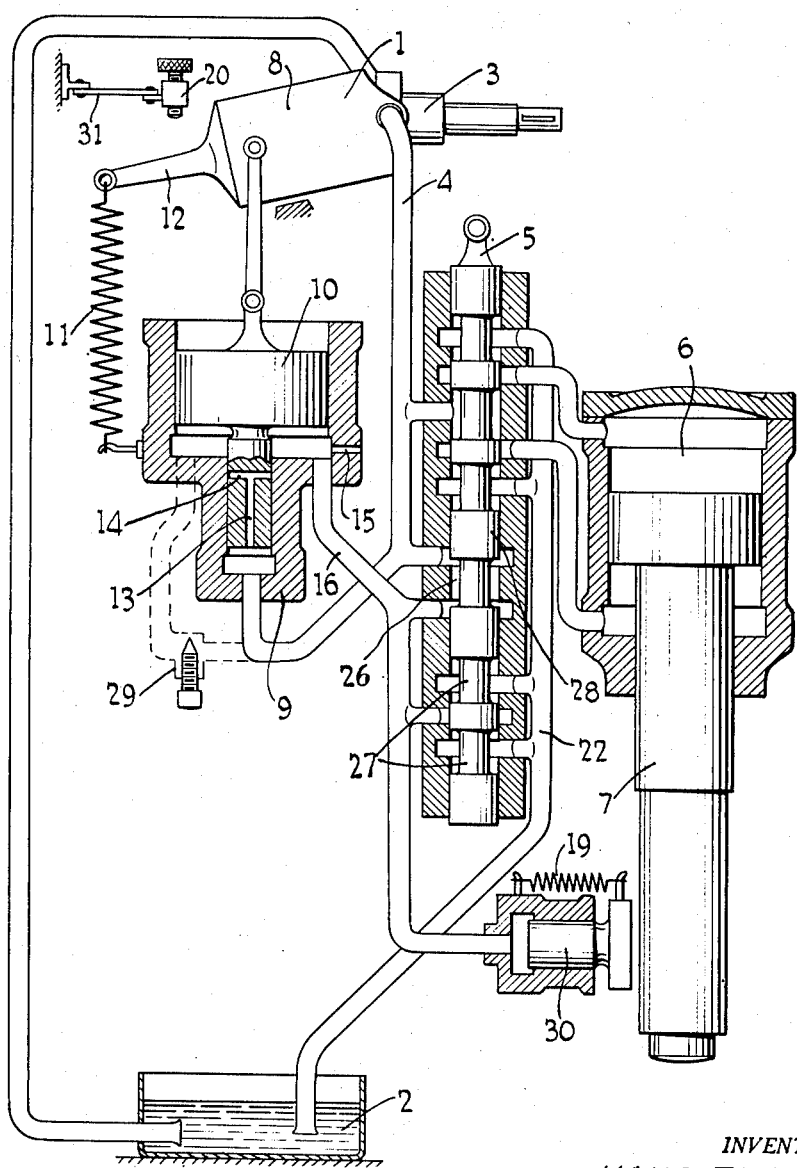

Fig. 2 shows another form of the invention wherein the main parts, such as pump 1, slide valve 5, compression cylinder, and pistons 6 and 7 are the same as in Fig. 1 and are designated in like manner. However, only a single pressure regulator 9 is present, which, however, is made at least two-stage. There is one pressure control line 16 which, exactly as in Fig. 1, could be operated by a slide mechanically connected with slide valve 5 and is led under the larger piston 10 of the pressure regulator. In Fig. 2, for example, the action of the separate auxiliary slide 17 with the triangular lever 18 of Fig. 1 is replaced by an auxiliary control appliance attached to the slide valve. This is so arranged (Fig. 2) that when in its median position a connection between the pressure line 4 of pump 1 and the pressure-control line 16 is established at 27. Only when there is a displacement of slide-valve 5 upwardly or downwardly from its median position, is the pressure-control line connected at 26 with the discharge line 22. Obviously, the same effect is thereby obtained hydraulically as in Fig. 1 with the auxiliary slide 17 operated mechanically by the triangular lever 18. There is lacking, however, the effect of the adjustment of the angle of swing of pump 1 on the valve. In so far as the same is not dispensable, or also cannot be replaced by a suitable choice of the stiffness of spring 11 in combination with a suitably executed slow, gradually opening up of the auxiliary control 26 and 27, a return lever 23 as in Fig. 1 could again be introduced into this hydraulic operating system if, for example, the slide-valve 5 shown in Fig. 2 were subdivided as at 28. In view of the small oil requirement of auxiliary control 26 and 27, use also may be made of the means customarily employed in the building of fuel pumps for a displacement of the guiding edges at 26 and 27. As an example, the edges can be made oblique or screw-shaped, and at the slide at 26 and 27 and in the slide-housing, control openings of limited extent in the peripheral direction of a rotatable slide-valve 5, which then in accordance with the position of its angle of rotation will yield the desired degree of dependence of the adjustment of the pressure-regulators, if the same, or also a rotary slide member with a suitable return linkage is connected with the angularly swinging part of the pump.

If further, transverse and longitudinal bores 13 and 14 are provided in the pressure-regulator piston of Fig. 2, similar to the corresponding bores at 9a in Fig. 1, then the appropriate protection against overloading, similar to that in Fig. 1, can be obtained. Also, the outlet throttle orifice 15 may be provided if the same is deemed necessary. The cooperating action of the multi-effect controls can very probably be determined in the desired manner, for which purpose it is merely necessary to determine the size of the individual stream of liquid, for example, by a suitable choice of the cross-sections of the control pipe-lines by appropriately building in throttling points or other known means.

In this sense, the invention, which requires pressure or stroke limitation for the regulable pump when the slide-valve 5 is in the median position, may be realized with a one-stage pressure-regulator. If, for example, in Fig. 2 the high-pressure line 4 is led to the high-pressure throttle point 29 directly under the large piston of pressure-regulator 9, then by a suitable adjustment of this throttle point, the desired high-pressure adjustment of pump 1 may be obtained if the small high-pressure piston at the pressure-regulator is omitted or if made of small dimensions, and has the function of bringing about the shunting out of the over-load by means of transverse or longitudinal bores 13 and 14. In order not to be penalized with large losses of high-pressure oil with this simplified form of construction, the discharge throttle point 15 will, it is true, be selected of an appropriately small dimension or the discharge control 27 will further be throttled appropriately, although in this case, it particularly suggests itself to omit one of these expedients.

The pressure and discharge control 26 and 27 shown in Fig. 2 may naturally also be so arranged that one operates only in one direction, as is advantageous, for example, for a press which requires high-pressure only in the one direction of its stroke. In the sense of the invention in this case that applies which has been mentioned in the description of the form of construction of Fig. 1 for the arrangement and adjustment of the auxiliary control 17 of Fig. 1 when it is in one direction only.

The inventive effect upon the movement or the generation of pressure by a regulable primary pump from the median position of the control member may in some cases be advantageously combined with braking appliances, which, for example, with a drive of the lifting mechanism prevent the dropping of the load in the median position of the slide-valve in conjunction with a generation of a reduced pressure. If, as previously mentioned, the slide-valve, is made, as a slide through which fluid flows, not tight when in its median position, then such a brake may be particularly advantageous. Its actuation may be obtained mechanically or hydraulically from the slide-valve. In Fig. 2, brake 30 is connected with pressure-control line 16 for the purpose of hydraulic actuation; a spring 19 taking care of the return movement of the brake when the slide-valve leaves its median position.

A stop 20 in Fig. 2 is conveniently adjustable according to operating conditions to cause a certain minimum of movement by the pump or to prevent the reversal of the direction of said movement. If this stop is, by means of spring 31 made as a spring-actuated stop, then it is thereby possible also to obtain a certain minimum generation of pressure for small movements in a manner less strongly dependent upon the desired or the unintended leaks in the system, particularly in the slide-valve.

In general, the invention, deviating from the constructional forms described in detail, may be varied in many ways with the use of known auxiliary means, without departing from its basic idea, namely saving power and utilizing the hydraulic parts as affecting the quantity moved or the generation of pressure by a regulable pump in dependence upon the adjustment of a slide-valve in its median position. Even though this appliance may find application primarily for shuntable drives, nevertheless it is clear that it may also be advantageous for stationary, non-shuntable drives, since these known arrangements show the same defects, for example, the drives with slide-valve and pressure-regulated pump show the usually unnecessary high generation of pressure during non-operation. In this case, a materially simple control appliance may take the place of the slide-valve or of the four slide-valves actuated by a cam-shaft. In many cases, a simple closure-slide or a closure-valve for the inflow of the compression liquid suffices because the closure of the liquid discharge from the operating cylinder or the rotating servo-motor is obviously necessary only when braking is required, for which an additional valve, an additional slide or an appropriately arranged, common slide would be necessary. But it is clear that in these cases too, the utilization of the invention is advantageous. Likewise, the advantageous manner of its execution may in these cases also be selected by way of example for control appliances suitable for shunting, as shown in Fig. 1 or 2 since this depends only upon the appropriate retarding of the stroke of slide-valve 5 for one side of its median position, and upon the omission of the mechanical or hydraulic means is not necessary.

In some cases, with a pump regulable by adjustment of the stroke, the hydraulic drive is stopped merely by opening a discharge valve at the pressure line of the pump. Particularly when a pressure-regulator also acts on the adjustment means of the pump, this has the disadvantage that large flow losses occur continuously when the plant is not operating. Also, the discharge member must be made very large in order actually to obtain stopping without too high a back pressure. In such a case, the invention may only advantageously be constructed in the manner shown in Fig. 3. 1 is a regulable pump, similar to the pump described in Figs. 1 and 2, with swingable frame 8 and a fixed, suitably driven driving shaft 3. The swinging frame 8 is pressed by the force of spring 11 against the pressure-regulating piston of pressure-regulator 9, whereby, for example, here there is mainly obtained protection of the plant against overloading without having to accept the disadvantages of a safety-valve. An adjustable stop 20, which limits the movement of the pressure-regulator piston, or any other manually or automatically adjustable action upon the stroke of pressure-regulator 9 to any operational magnitude may serve the purposes of the regulation of the drive. The secondary member here, by way of example, is a rotary oil-motor 32, also regulable in any manner similarly to the pump if so desired.

In order to stop the drive, the comparatively small control-slide 33 is first moved downward from the position as drawn, so that the adjustment cylinder 34, which previously was connected with the oil vessel, receives pressure from pressure line 4. Then acting against the action of spring 11 by adjustment of the stroke of the pump to a small value, it stops the drive, while a brake-cylinder 35 with brake-piston 36 acting upon brake-disc 37 and interposed parallel to adjustment-cylinder 34, brings the drive completely to a stop if its load does not suffice for holding the same firmly in spite of the action of the residual pressure emanating from the tension of spring 11. Now, in order that this residual pressure need not be too great, it may be advantageous to keep the tension of spring 11 comparatively small, or with the horizontal construction shown, to replace it by a simple gravity effect, such as the weight of the swinging pump frame. A weak spring 11 also may be included particularly if a further, smaller adjustment-cylinder 34a, which is permanently connected with pressure-line 4, supports the same.

Figure 3:
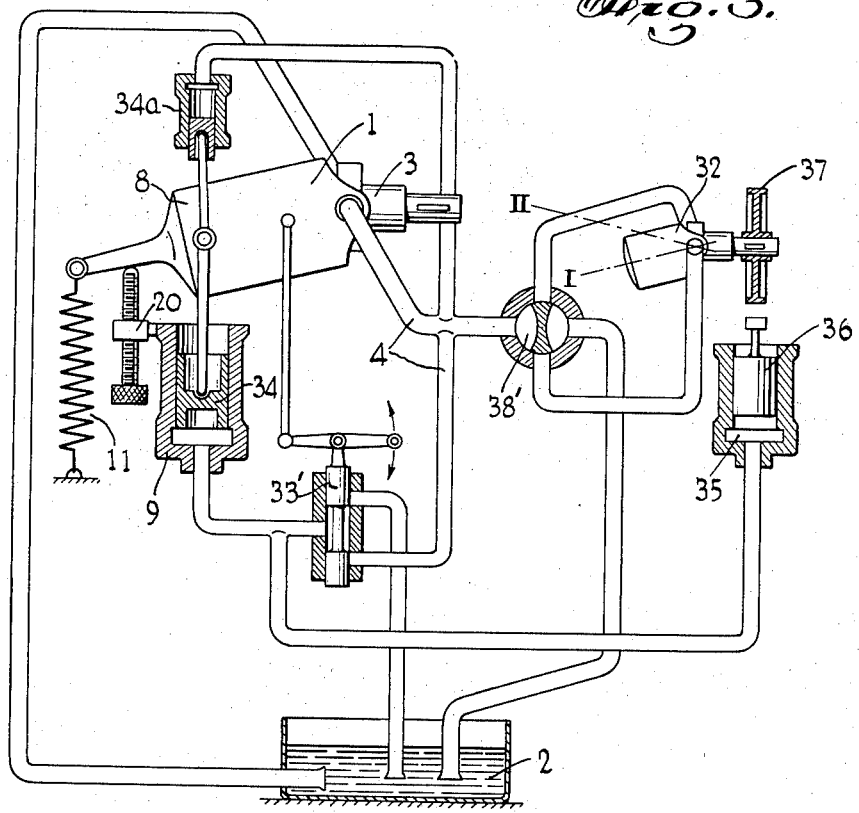

The arrangement shown in Fig. 3, in contradistinction to the inclusion of a simple discharge-valve, possesses the advantage that a slide-valve of small dimensions suffices to bring about stopping of the plant by utilizing a pressure-regulator frequently present for protection against overload. Then for this stopping of the plant, use is made in accordance with the invention of a separate low-pressure regulator, or, corresponding to the form of execution according to Fig. 2 of a multi-stage pressure-regulator or one adjustable by changing the throttle points, so that in order to stop the plant it is not necessary to allow the pump to generate its maximum pressure continuously, which, in addition to the disadvantages of the known control appliances as described in the introduction, would here possess the further disadvantage that the brake for holding the secondary member stationary would have to be very powerful.

In some cases such a brake 30 is also desirable in Fig. 3 in order to hold the secondary member stationary on stopping the plant when putting it out of operation. In this case, a return movement of the spring will not be chosen for this brake, but the impact of a spring or weight, and perhaps additionally, or even by itself, an actuating cylinder which, with the occurrence of a certain minimum pressure in pressure line 4 actuates the brake in case the slide-valve 33 which correspondingly is to be adjusted in an obvious manner, is in the operating position. Instead of this, the actuation of the brake may be undertaken by other known mechanical, electrical, or hydraulic appliances, even to a tachometric appliance of this type, connected with the drive of the primary pump.

In place of the described, hydraulically-operated mechanical pump of Fig. 2 or 3, similar mechanically, hydraulically or even electrically-operated locking devices may serve. In the form of construction according to Fig. 2, the locking of the stroke of the compression piston, especially for preventing it from sliding off under its own weight during prolonged rest, a valve in the lower connecting line of the compression cylinder and actuated mechanically, electrically or even hydraulically in dependence upon the position of the slide-valve, may be used, such can be made tighter than slide-valve 5 with greater ease.

In the method of control of Fig. 3, it would be possible in addition to the means shown serving only for the stopping, to include a shunting appliance of known type, such as a valve 38 to be actuated only at low operating pressures. Instead of this, the shunting may there also be undertaken by an adjustable oil-motor, reversible from I to II in the opposite direction of rotation, said oil motor being for example, of the axial piston tumbler ring type.

Figure 4:
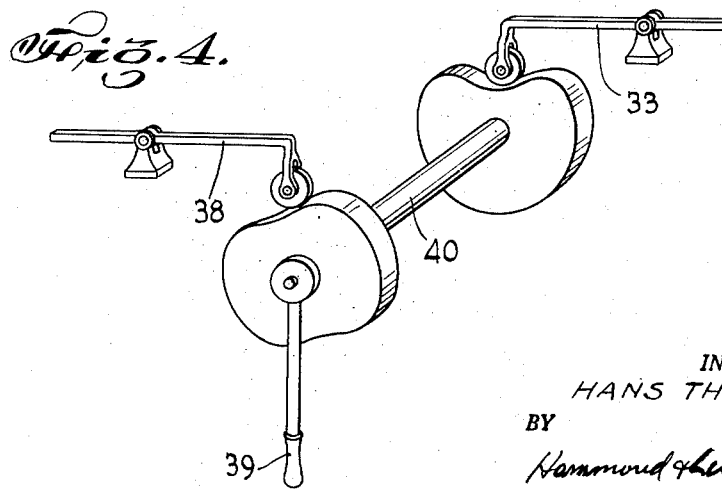

Slide-valve 33 and shunting member 38 also may be actuated together in such manner that the non-discharge shunting member is adjusted only when the plant is under low pressure. This purpose may be accomplished, for example, by the device shown in Fig. 4 in a schematic, perspective plan. Here manual lever 39 can be used to adjust cam-shaft 40; the cams being of such shape that the displacement of the shunting member to be attached to lever 38 in Fig. 4 proceeds only when slide-valve 33 is adjusted for low pressure. In other respects the invention relates mainly to hydraulic drives with pumps regulable by the adjustment of the stroke thereof. It is however, possible in suitable cases to obtain similar effects with a secondary member regulable by the adjustment of the stroke. A drive with constant torsion-moment load in a hydraulic drive yields, for example, an operating pressure inversely proportional to the secondary stroke. It is therefore also possible to use the invention for drives in which regulation of the pressure is obtained by adjustment of the secondary stroke alone or in combination with an adjustment of the primary stroke.

In the constructional examples, shown, pressure-regulators are indicated which are of the simplest type of construction, consisting of a compression cylinder under the pressure of the liquid to be regulated or a certain fraction thereof which is balanced against the force of a spring bringing about an increase of the stroke of the pump. Particularly with larger types of construction other known or obvious shunting means can be used for reasons of space. Since the special type of construction of the pressure-regulator, as well as most of the structural details selected by way of example, are immaterial for the invention, it is not necessary to describe such variants in the form of execution here in greater detail.

What is claimed:

1. In a hydraulic control fluid pressure system, the combination comprising a variable delivery fluid pressure pump means, a main control valve means hydraulically connected with said pump means and with a secondary controlled circuit, a fluid pressure reducing control means connected to said variable delivery pump means adapted to reduce the delivered pressure therefrom, and means connecting said pressure reducing control means and said main control valve, said pressure reducing control means acting on said pump means to reduce the fluid pressure of the pump when said main control valve means is moved to approach its inoperative position tending to cut off hydraulic flow to said secondary circuit.

2. In a hydraulic control fluid pressure system, the combination comprising a variable delivery fluid pressure pump, a main valve controlling a secondary circuit hydraulically connected to said pump means and to an auxiliary two-stage control piston means connected to act on the pump in a pressure-reducing way each time a predetermined over-pressure occurs at the pump delivery, a second auxiliary control piston means connected to said pump means operable upon an increase of fluid pressure delivered by said pump means to reduce said fluid pressure delivered by the pump, an auxiliary control valve in the feed connection of the second auxiliary piston with said pump, and mechanism interconnecting said main control valve and said auxiliary control valve so that the last mentioned valve is urged in a fluid feed position to the second auxiliary piston when the main control valve is brought into a non-delivery position.

3. In a hydraulic control system as in claim 2, said two-stage control piston having a low pressure part and a high pressure stage with a bore therein, said bore normally cooperating with the cylinder wall so as to be normally closed but becoming open as soon as the piston moves under the action of an over-pressure, thereby allowing the fluid to flow into and to act upon the low pressure part of the two-stage control piston.

4. In a hydraulic control circuit as in claim 2, said two-stage control piston having a low pressure part and a high pressure stage with a bore therein, said bore normally cooperating with the cylinder wall so as to be closed but becoming uncovered as soon as the piston moves under the action of an over-pressure, thereby allowing the fluid to flow into and to act upon said low pressure part of the two-stage control piston, the low pressure part having a throttled discharge opening.

5. In a hydraulic control fluid pressure system, the combination comprising a variable delivery fluid pressure pump hydraulically connected to a main valve controlling a secondary circuit and connected to an auxiliary two-stage control piston, said two-stage control piston being connected to the pump to act in a pressure-reducing direction when a predetermined over-pressure occurs in the main circuit leading from the pump, a second auxiliary control piston connected to the pump to act in a pressure-reducing direction upon increase of normal working pressure, an auxiliary control valve in the feed connection of said second auxiliary piston to said pump, and mechanism connecting the main control valve with the stem of a T-shaped lever, the wings of which are urged under spring action against relatively fixed bearings, while the center of the T is connected to the said auxiliary control valve to urge said valve out of the direct fluid feeding position of the second auxiliary piston when the main control valve is brought to a working position from a median non-operating position.

6. In a hydraulic control circuit as in claim 5, a link connecting the center of said T-shaped lever to the center of a double-lever, one of the arms of which acts on the auxiliary control valve while the other arm is connected to the means altering the delivery of the pump, the rocking of the double-lever resulting from a decreased delivery corresponding to the shutting off of the auxiliary control valve.

7. In a hydraulic control fluid pressure system, the combination comprising a variable delivery fluid pressure pump hydraulically connected to a main valve controlling a secondary circuit and to an auxiliary two-stage control piston having a high pressure and a low pressure part, said piston being connected to act on the pump in a pressure-reducing way when a predetermined over-pressure occurs in the main circuit from the pump delivery, said high-pressure part of the control piston having a bore therein normally cooperating with the cylinder wall so as to be closed but becoming uncovered as soon as the piston moves under an over-pressure, thereby allowing fluid to flow into the low pressure part of the two-stage control piston and to act thereon, a conduit connecting said low-pressure part with elements of said main valve, one element exhausting the control device when the main valve is moved to working position, while another element connects said low-pressure part with the controlled circuit when the main valve is in a neutral position, thereby causing said pump to have its outlet pressure reduced by over-pressure.

8. In a hydraulic control circuit as in claim 7, a hydraulic braking device connectable with the main working mechanism, and connected with said low-pressure part so as to hold the working mechanism in position when the main valve is in non-operating position.

9. In a hydraulic control fluid pressure system, a variable delivery fluid pressure pump hydraulically connected to a main valve controlling a secondary circuit and to a throttled conduit leading to an auxiliary control piston acting on the pump in a pressure-reducing direction when said piston is subjected to the working pressure of the system, a throttled discharge opening in the wall of the cylinder holding said control piston, a second conduit connecting said cylinder with elements of the main valve, one element exhausting the control device when the main valve is operated to working position, while the other element connects the cylinder with the controlled circuit when the main valve is in a neutral position.

10. In a hydraulic control circuit as in claim 9, a hydraulic braking device of the controlled working mechanism, connected with the cylinder holding the control piston.

11. In a hydraulic control circuit, the combination comprising a variable delivery pump hydraulically connected to a working device by a main control valve and to two control pistons of different diameters, one of said control pistons having a smaller diameter having a pressure increasing action on the pump and the other of said control pistons having a larger diameter having a pressure reducing action on the pump, a control valve inserted between the main circuit and the larger piston to connect said piston to the main circuit when stopping of the working device by shifting the main control valve to its inoperative position is wanted, and connect said larger piston to a discharge conduit when the working device is put in motion by shifting the main control valve out of its inoperative position.

12. In a hydraulic control circuit, the combination comprising a variable delivery pump hydraulically connected to a working device by a main control valve and to two control pistons of different diameters, one of said control pistons having a smaller diameter with a pressure increasing action on the pump and the other having a larger diameter with a pressure reducing action on said pump, a control valve inserted between the main circuit and the larger piston to connect said piston either to the main hydraulic circuit when stopping of the working device by shifting the main control valve to its inoperative position is wanted, and to a discharge conduit when the working device is put in motion, links connecting said control valve with a pump regulating means urging said control valve to a discharge position of the larger piston each time the delivery of the pump is reduced.

13. In a hydraulic control circuit as in claim 12, a fluid motor driven by the main pressure fluid, a control device for said fluid motor, and a cam connection between said control device and the links acting on said control valve.

HANS THOMA.

REFERENCES CITED

The following references are of record in the file of this patent:

UNITED STATES PATENTS

| Number | Name | Date |
|---|---|---|
| 1,863,448 | Landenberger et al. | June 14, 1932 |
| 1,885,077 | Cannon | Oct. 25, 1932 |
| 1,902,063 | Ferris et al. | Mar. 21, 1933 |
| 2,009,608 | Douglas | July 30, 1935 |
| 2,238,063 | Kendrick | Apr. 15, 1941 |
| 2,258,981 | Ernst | Oct. 14, 1941 |
| 2,285,069 | Vickers | June 2, 1942 |
| 2,333,530 | Ernst | Nov. 2, 1943 |
| 2,394,785 | Kindervater | Feb. 12, 1946 |